Patented Apr. 25, 1933

1,905,287

UNITED STATES PATENT OFFICE

RICHARD HERZ, OF FRANKFORT-ON-THE-MAIN, AND MAX SCHUBERT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR MANUFACTURING NUCLEAR HALOGENATED DERIVATIVES OF ARYLAMINOTHIAZOLE COMPOUNDS

No Drawing. Application filed January 24, 1930, Serial No. 423,257, and in Germany January 26, 1929.

The present process relates to an improvement in the process of manufacturing nuclear halogenated derivatives of arylaminothiazole compounds.

It has been found that it is possible to introduce halogen atoms into the aromatic nuclei of aminoaryl thiazole compounds of the general formula

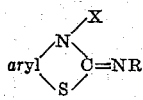

wherein aryl means an aromatic radical which may contain further substituents, X means hydrogen or alkyl or aryl, R hydrogen or an aryl radical, by subjecting them to the action of the halogen (chlorine and bromine), that is, of free halogen as well as of halogen produced in situ by using agents evolving halogen; hereinafter, for the sake of brevity all these agents will be called "halogens". The introduction of halogen atoms is advantageously favored by the addition of a suitable halogen carrier.

The halogen atoms preferably enter the para position related to the ring nitrogen atom. It is possible according to the present process to introduce one or more halogen atoms into the aromatic nuclei.

The nuclear halogenated derivatives of amino-aryl-thiazole compounds which are obtainable according to the present process with an excellent yield in a very pure state can be converted by the interaction of a caustic alkali-solution into the corresponding halogenated ortho-amino-aryl-mercaptans which are important intermediates for the production of vat dyestuffs. The present new process therefore is of a great technical value.

In the process described by Hunter (Journal of Chem. Society, London, 1927, page 1186 ff) for acting with bromine on aminothiazoles a great excess of bromine, mostly quantities corresponding to about six atoms of bromine, is used for introducing only one bromine atom into the aromatic nucleus.

In contradistinction thereto the present process does not need an excess of halogen or halogenating agents respectively; a quantity not exceeding considerably the theoretical amount is sufficient for the present new process, a fact which is of a great advantage from an economical point of view.

A further advantage of the present process consists in the fact that it is not necessary to start from isolated amino-aryl-thiazole compounds, but one can subject to the process likewise amino-thiazol compounds produced in situ. It is therefore possible to combine the manufacture of the amino-aryl-thiazolic compounds according to the process of our copending application with the nuclear halogenation process in a single operation, by starting from the thio-urea derivatives of the aforesaid general formula without isolating an intermediate product.

This fact allows particularly an extremely more economical manufacture of nuclear brominated derivatives compared with the preparation described by Hunter by effecting the ring closure to the thiozolic compounds by means of the cheaper chlorine or chlorinating agents respectively and by introducing the nuclear bromine atoms in the same medium with the theoretical amount of bromine.

Example 1

When starting from o-tolyl-thiourea one can produce the 4-methyl-6-chloro-benzothiazole in one operation without isolation of the 2-amino-4-methyl-benzo-thiazole. In this case one may proceed as follows:

To a suspension of 16,6 parts of o-tolyl-thiourea in 80–100 parts of chlorobenzene at 30–50° C., 16–18 parts of sulfuryl-chloride are added while stirring. Then advantageously a current of air is allowed to pass through the reaction mass until the gaseous reaction products have been removed. Then 80–100 parts of methanol are added, and to the solution thus formed 10–11 parts of chlorine are introduced at about 0° C. The reaction mass is worked up as said above. In this manner immediately the 2-amino-4-methyl-6-chloro-benzo-thiazole of the formula

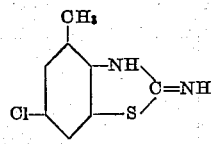

is formed in a very good yield.

*Example 2*

To a suspension of 16,6 parts of o-tolyl-thiourea in 84–100 parts of chlorobenzene at 30–50° C. 16–18 parts of sulfuryl chloride are added while stirring. Advantageously the gaseous reaction products are removed by blowing in a current of air. Then about 30–50 parts of methanol and slowly a solution of 16 parts of bromine in about 10–15 parts of methanol are added. The reaction mass is heated to boiling point and the formed crystalline precipitate is filtered off and the free base is isolated in the usual manner. In this manner in a very good yield the 6-bromo-4-methyl-2-amino-benzo-thiazole of the formula

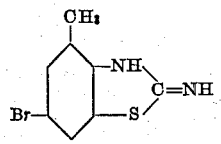

is obtained.

*Example 3*

10 parts of o-tolyl-thiourea are suspended in about 60 parts of glacial acetic acid with addition of 2–4 parts of anhydrous aluminium chloride or phosphorus pentachloride. At 20–40° C. 12–13 parts of chlorine are slowly introduced. The separated reaction product is filtered off, dissolved in hot dilute hydrochloric acid and transformed in the usual manner into the free base. The 2-amino-4-methyl-6-chlor-benzo-thiazole thus formed is identical with the product of Example 1.

*Example 4*

16,6 parts of o-tolylthiourea are introduced while stirring at 10–20° C. into 75 parts of sulfur dichloride (S Cl$_2$), whereby with a vivacious reaction at first a clear solution is obtained from which the reaction product separates. Then the reaction mass is stirred for some hours at 50–60° C. The 2-amino-4-methyl-6-chloro-benzo-thiazole thus formed is isolated as described in the foregoing example.

We claim:

1. A process for manufacturing compounds of the probable formula:

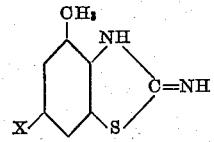

wherein X means chlorine or bromine, which process comprises acting with sulfurylchloride at 30–50° C. on a suspension of o-tolyl-thiourea in an aromatic high-boiling diluent, adding methanol to the reaction mass and acting finally with the theoretical amount of a halogen of the group consisting of chlorine and bromine calculated for the introduction of one halogen atom.

2. A process for manufacturing 2-amino-6-chloro-4-methyl-benzothiazole of the probable formula:

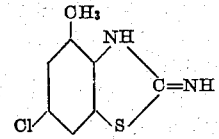

which process comprises acting with sulfurylchloride at 30–50° C. on a suspension of o-tolyl-thiourea in an aromatic high-boiling diluent, adding methanol to the reaction mass and acting finally with the theoretical amount of chlorine calculated for the introduction of one chlorine atom.

3. A process for manufacturing 2-amino-6-bromo-4-methyl-benzothiazole of the probable formula:

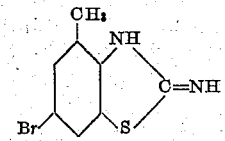

which process comprises acting with sulfurylchloride at 30–50° C. on a suspension of o-tolyl-thiourea in an aromatic high-boiling diluent, adding methanol to the reaction mass and acting finally with the theoretical amount of bromine calculated for the introduction of one bromine atom.

In testimony whereof we affix our signatures.

RICHARD HERZ.
MAX SCHUBERT.